(12) United States Patent
Einecke et al.

(10) Patent No.: US 10,129,521 B2
(45) Date of Patent: Nov. 13, 2018

(54) DEPTH SENSING METHOD AND SYSTEM FOR AUTONOMOUS VEHICLES

(71) Applicant: HONDA RESEARCH INSTITUTE EUROPE GMBH, Offenbach/Main (DE)

(72) Inventors: Nils Einecke, Offenbach (DE); Julian Eggert, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 660 days.

(21) Appl. No.: 14/151,909

(22) Filed: Jan. 10, 2014

(65) Prior Publication Data

US 2014/0225990 A1 Aug. 14, 2014

(30) Foreign Application Priority Data

Jan. 16, 2013 (EP) .................... 13151524

(51) Int. Cl.
*H04N 13/02* (2006.01)
*H04N 13/128* (2018.01)
*G06T 5/00* (2006.01)
*G06K 9/00* (2006.01)
*G06T 7/593* (2017.01)

(52) U.S. Cl.
CPC ....... *H04N 13/128* (2018.05); *G06K 9/00805* (2013.01); *G06T 5/006* (2013.01); *G06T 7/593* (2017.01); *G06T 2207/10012* (2013.01); *G06T 2207/30261* (2013.01)

(58) Field of Classification Search
CPC .................... G06T 2207/30252; G06T 7/2046

USPC .......................................... 348/47
See application file for complete search history.

(56) References Cited

U.S. PATENT DOCUMENTS

| | | | | |
|---|---|---|---|---|
| 5,768,404 A | * | 6/1998 | Morimura | G06K 9/20 348/E13.014 |
| 2002/0122113 A1 | * | 9/2002 | Foote | G06T 3/4038 348/48 |
| 2005/0100207 A1 | * | 5/2005 | Konolige | G06T 7/0071 382/154 |
| 2010/0074532 A1 | * | 3/2010 | Gordon | G01B 11/25 382/203 |

(Continued)

FOREIGN PATENT DOCUMENTS

EP 2386998 A1 11/2011

OTHER PUBLICATIONS

Gandhi "Detection of Obstacles on Runway using Ego-Motion compensation and Tracking of Significant Features" on Dec. 4, 1996 published by IEEE.*

(Continued)

*Primary Examiner* — Frederick D Bailey
*Assistant Examiner* — Masum Billah
(74) *Attorney, Agent, or Firm* — Squire Patton Boggs (US) LLP

(57) ABSTRACT

In one aspect, an image processing method for processing images is provided, comprising the steps of: obtaining, from an optical sensor, at least two images, determining an image warping function at least partially compensating the distortion, applying the determined image warping function to the image including the distortion, and calculating by a processing unit, and outputting, a depth and/or disparity image from the at least two images.

19 Claims, 2 Drawing Sheets

(56) References Cited

U.S. PATENT DOCUMENTS

Figure 1:
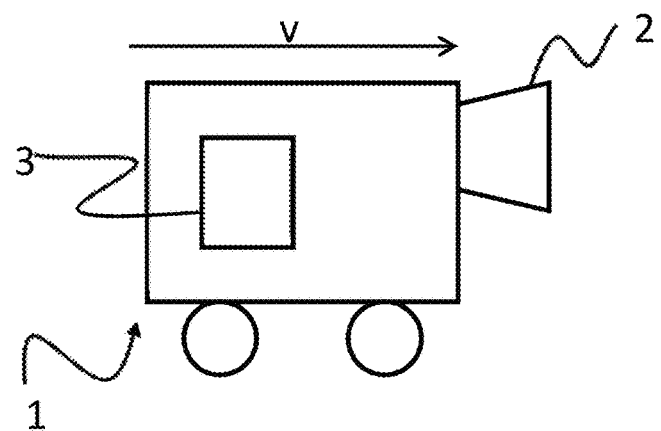

| | | | | |
|---|---|---|---|---|
| 2010/0315505 | A1* | 12/2010 | Michalke | G06T 7/251 348/118 |
| 2012/0014590 | A1* | 1/2012 | Martinez-Bauza | H04N 13/0271 382/154 |
| 2012/0147139 | A1* | 6/2012 | Li | G03B 35/08 348/43 |

OTHER PUBLICATIONS

Gandhi ("Detection of Obstacles on Runway using Ego-Motion compensation and Tracking of Significant Features" on Dec. 4, 1996 published by IEEE).*

Detection of Obstacles on Runway using Ego-Motion compensation and Tracking of Significant Features on Dec. 4, 1996 published by IEEE.*

Peter Burt et al., "Electronically directed focal stereo, Adaptive hierarchical stereo matching using object segmentation and window warping," 1995, Proceedings of fifth international conference on computer vision, Jun. 20, 1995, pp. 94-101.

European Search Report dated Apr. 17, 2013 corresponding to European Patent Application No. 13151524.9.

Myron Z. Brown, et al., "Advances in Computational Stereo," Transactions on Pattern Analysis and Machine Intelligence, vol. 25, No. 8, Aug. 1, 2003, pp. 993-1008, XP011099378.

Julian Eggert et al., "Template Matching for Large Transformations," Sep. 9, 2007, Artificial Neural Networks a ICANN 2007; pp. 169-179, XP019069452.

Jae-Chul Kim et al., "Adaptive Hierarchical Stereo Matching Using Object Segmentation and Window Warping," SYstems, Man, and Cybernetics, 2001 IEEE International Conference on Systems, Man and Cybernetics. E-Systems and E-man for Cybernetics in Cyberspace, vol. 4, Oct. 7, 2001, pp. 2295-2300, XP010568763.

Daniel Scharstein et al., "A Taxonomy and Evaluation of Dense Two-Frame Stereo Correspondence Algorithms," International Journal of Computer Vision, 47 (1-3):7-42, 2002, pp. 1-35.

* cited by examiner

DEPTH SENSING METHOD AND SYSTEM FOR AUTONOMOUS VEHICLES

The invention relates to an method and an optical sensor system, e.g. for an autonomous or partially autonomous vehicle, using an optical sensor, in particular a stereo camera or multi-camera system, for depth and or disparity calculation in order to navigate and to avoid obstacles/objects on a movement path of the system/vehicle.

For navigation of an autonomous vehicle, it is important to find out accessible areas which can be used by the vehicle for movement but also non-accessible areas the vehicle cannot use for movement. For an autonomous car, it is, e.g., necessary to determine drivable areas (i.e. areas where the car can drive) and non-drivable areas (i.e. areas that have to be avoided).

In case of the autonomous car, a drivable area could for example be the road while the non-drivable area could be the walkway. In case of an autonomous lawn mower, the drivable area could be the lawn and the non-drivable area could be a flower bed.

For obstacle/object detection it is important to avoid protruding structures because these can cause damage to the autonomous ground vehicle or the vehicle can cause damage to the structure. In case of the car, such objects could be other traffic participants like cars or pedestrians or hard structures like a crash barrier or a traffic light. In case of an autonomous lawn mower such objects could be garden furniture or people walking on the grass.

The sensor system comprises at least one optical sensor, such as a camera (CCD, CMOS, . . . ), a laser scanner, an infrared sensor, etc. The optical sensor produces images and sends these images to a processing unit, e.g. as a stream of images. The optical sensors can also in particular be a stereo camera or a multi-camera system, in which more than two cameras produce a picture of the same scene at the same time from different viewing angles.

The processing unit processes the images and derives image information from the images provided by the at least one optical sensor. The processing unit may be part of the optical sensor system, but may also be positioned remote from the sensor system. For example, an image stream can be supplied from a camera-based stream recording system to the processing unit for processing.

In order to find an accessible area and/or to detect objects, a depth image is computed by finding correlating pixels or correlating image patches between a left and a right image supplied by the optical sensor, e.g. the stereo camera or multi-camera system. The correlations are determined by comparing pixel patches from the left image with pixel patches from the right image. The distance of the correlating patches is converted into depth data. This depth data allows reconstructing a 3D scene layout which can then be used for detecting drivable areas or obstacles.

Document EP 10 162 822 describes a robust matching measure and a summed normalize cross-correlation method (SNCC), which can be used for block-matching correlation searches. One application of this is for example the stereoscopic depth computation from stereo images. In contrast to the present invention, no image warping techniques are used to improve the matching (correlation) quality.

Document "Scharstein, D. and Szeliski, R. (2002). A taxonomy and evaluation of dense two-frame stereo correspondence algorithms. International Journal of Computer Vision, 47(1-3):7-42." provides an overview of the most common stereo computation algorithms. In contrast to the invention none of the presented algorithms uses an image warping to improve the accuracy and robustness of the estimated depth (disparity) values.

An autonomous vehicle 1, as schematically and exemplarily shown in FIG. 1, autonomously moves from a starting point to a destination without planned intervention by a passenger of the autonomous vehicle. On the movement path from the starting point to the destination, the autonomous vehicle en route automatically adapts its movement path to traffic conditions.

In order to perceive its environment, the autonomous vehicle typically comprises a number of sensors sensing the environment but at least an optical sensor system 2, which comprises at least an optical sensor. Basically, sensing in this case means that the autonomous vehicle processes data supplied by the sensors in a processing unit 3 to derive parameters that describe aspects of the environment. Together, the derived parameters form a virtual model of the vehicle's view of the environment.

The autonomous vehicle 1 continuously monitors the parameters and makes decisions based on the parameters, i.e. the result of a calculation or parameter comparison leads to a result which leads to an execution of a specified process. A decision is made, when specific constraints or thresholds are reached by the parameters. While a number of different decisions can be made, for autonomous movement, decisions that lead to movement changes of the vehicle are of interest, as they influence other traffic participants.

For effecting movement changes, the vehicle 1 typically comprises at least actuators for actuating steering, for accelerating or decelerating (braking) the vehicle and/or for communicating with the passengers. After a decision is made, i.e. a process is started, the autonomous vehicle 1 actuates the actuators in accordance with steps, calculations and/or comparisons specified in the respective process.

At least some of the optical sensors can be cameras, which are used to produce the image sequence e.g. for calculating an optical flow in order to enhance navigation and to avoid objects/obstacles in the movement path of the autonomous vehicle 1.

For both the navigation and the object detection it is important to have depth estimation, especially of the ground in the case of ground vehicles. Unfortunately, especially when using a stereo camera or multi-camera system, the typical parallel relation between the camera's optical axis and the surface, e.g. a ground surface, leads to strong perspective differences (distortions) between the left and right stereo images.

This strong difference impairs the correlation of the image patches because due to it the patches in the left and right view look different.

This invention aims to reduce this problem and thus improve the depth perception especially of the ground which, in turn, improves the navigation and object avoidance of autonomous vehicles.

In one aspect, an image processing method for processing images is provided, comprising the steps of: obtaining, from an optical stereo sensor, at least two images, optionally detecting whether one of the at least two images includes a distortion, applying an image warping function to at least one of the two images to compensate a distortion in the image by modifying the image, calculating, by a processing unit, and outputting a depth and/or disparity image from the modified image and at least one other image of the at least two images, and correcting, the depth and/or disparity image by subtracting shifts introduced due to the warping function application.

The disparity image can be corrected by subtracting shifts introduced due to the warping function application.

The optical sensor can be a stereo camera and/or a multi-camera system. The distortion can be a perspective difference between the at least two images. The perspective difference can result from a spatial offset in the optical sensor, or the cameras forming the optical sensor.

The depth and/or disparity image may be calculated with a block-matching method.

A summed of normalized cross-correlation can be used as a correlation measure.

The images may be additionally corrected for lens distortion of the optical sensor.

The images can be additionally rectified for parallel epipolar lines. This is a well-know technique which geometrically corrects the stereo camera images such that corresponding pixels in the left and right stereo image lie on the same image line. Typically, this rectification is done showing a checker-board to the stereo camera and detecting the line offsets for corresponding checker board corners. The rectification corrects for small irregularities that cannot be avoided when building a stereo camera, e.g. it is very hard to build a stereo camera such that the imaging chips are co-planar. Since the rectification corrects camera intrinsic errors it needs to be done only once and is completely independent of the scene layout captured with the camera.

More than one image warping function may be applied to the image including the distortion.

The method steps can be performed more than once, each time with a different image warping function and corrected disparity/depth images resulting from each performance can be combined into one disparity/depth image.

In addition to the computation of the depth and/or disparity image from the warped image a depth and/or disparity image from the unwarped camera images may be calculated and wherein the results are merged into one disparity/depth image.

The image warping function for a current image may be estimated from a previous depth and/or disparity image or from a set of previous depth and/or disparity images. Since the warping model mainly depends on the scene layout, e.g. the orientation of the road surface with respect to the stereo camera, the warping model can be fit (e.g. by means of gradient descent) to the data (disparity/depth map) achieved from the last time step. In this case, the warping model undergoes a kind of bootstrapping process because the warping model estimated from the last time step will improve the current disparity or depth map which will lead to an even more improved warping model for the next time step.

As an alternative, the image warping function can also be defined a priori and fixed and/or is an affine model.

Structures in a scene observed by the optical sensor may be separated into accessible and/or non-accessible areas. One way to achieve this is to compute from the 3-D depth data for each pixel the height above ground. With a simple threshold pixels can now be grouped into ground or accessible areas (e.g. height <=10 cm) and into non-accessible area (e.g. height >10 cm). Another means could be to group neighboring pixels with homogenous depth or disparity values. Such regions typically are upright obstacles like cars or humans.

Objects and/or moving objects in a scene observed by the optical sensor are detected based on the depth and/or disparity results resulting from the calculation of the depth and/or disparity image.

The optical stereo sensor can be a multi-sensor system.

In another aspect, a sensor system comprising at least an optical stereo sensor, the system furthermore comprising means for obtaining from the optical stereo sensor, at least two images, optionally means for detecting whether one of the at least two images includes a distortion, means for applying an image warping function to at least one of the two images to compensate a distortion in the image by modifying the image, means for calculating and outputting a depth and/or disparity image from the modified image and at least one other image of the at least two images, and means for correcting, the depth and/or disparity image by subtracting shifts introduced due to the warping function application.

The system can be adapted to perform a method as outlined above.

In still another aspect, a land, air, sea or space vehicle equipped with a sensor system as described above is provided.

The vehicle can be a robot or a motorcycle, a scooter, other wheeled vehicle, a passenger car or a lawn mower.

In yet another aspect, a vehicle driver assistance system is provided including the sensor system as previously described.

In another aspect, a computer program product performing the above method, when executed on a computer, is provided.

Figure 2:
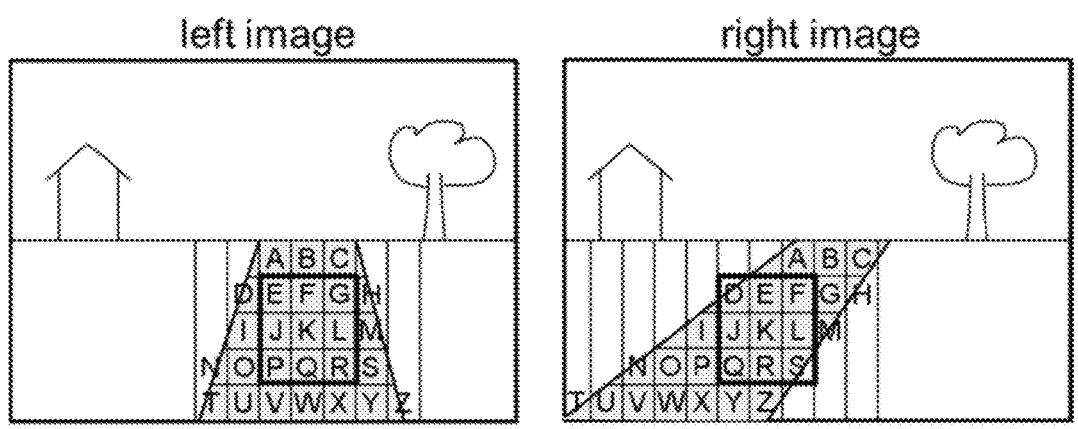
Figure 2:
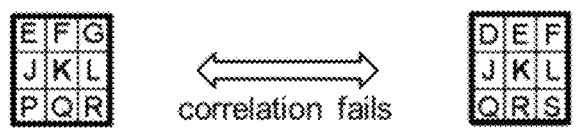
Figure 3:
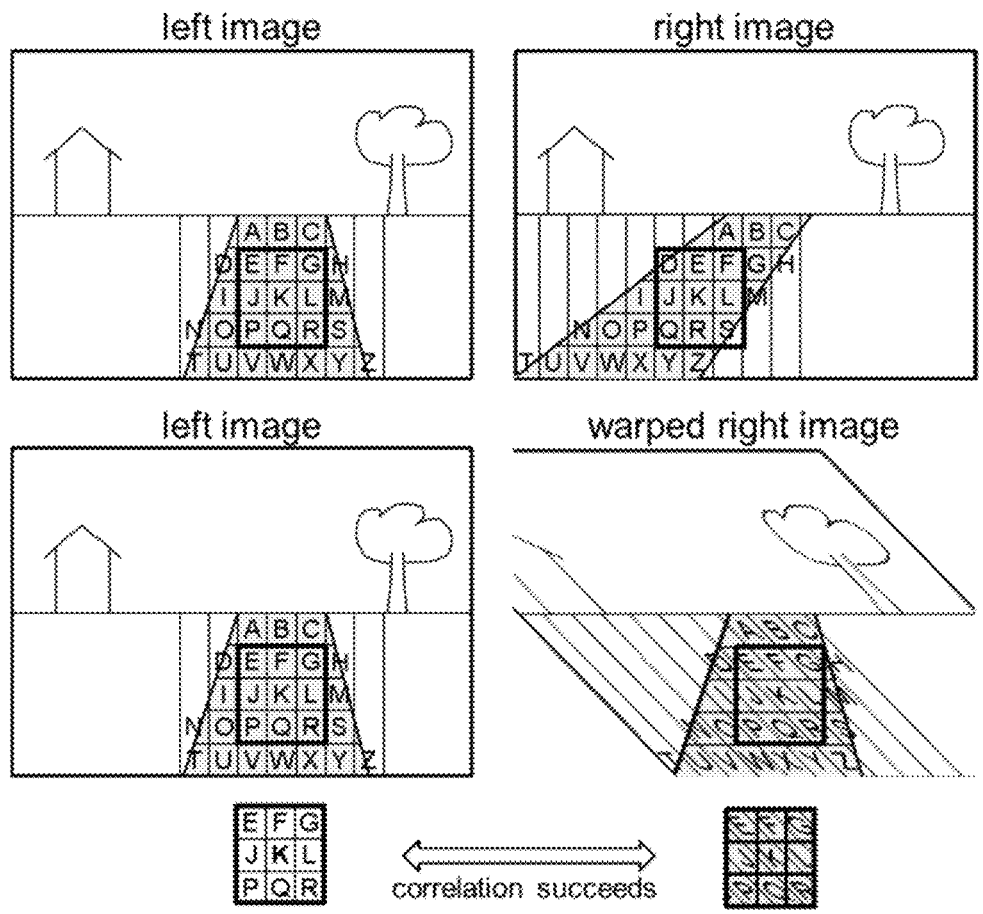
Figure 4:
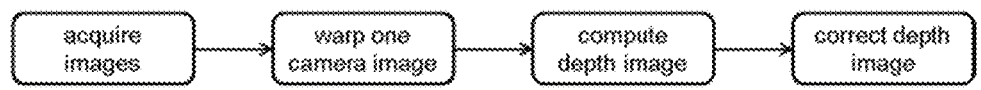

The invention is now also described with reference to the figures. In particular, FIG. 1 shows exemplarily and schematically an autonomous vehicle;

FIG. 2 exemplarily and schematically shows a captured left and right image of a stereo image;

FIG. 3 exemplarily and schematically shows the captured left and right image of the stereo image of FIG. 2 and below exemplarily and schematically the captured left and a warped right image of a stereo image;

FIG. 4 shows key method steps of the method as a flow chart.

The main intention of this invention is to improve the depth estimation performance or depth estimation in stereo or multi-camera systems by supporting the correspondence search between images recorded by the camera systems.

For estimating depth from stereo or multi-camera images it is necessary to find correlating image pixels in the images which belong to one 3D instance in the scene observed with the camera. A multi camera system is similar in the sense that either each pair of cameras can be used as a stereo camera or that one camera is defined as a reference camera and all other cameras are treated like the second camera of a stereo camera system. This means that correlating pixels are either searched in each camera pair or between the reference camera images and the images of all other cameras. In the following, when a stereo camera is referred to, it should be understood, that a multi-camera system can be also used.

After pixel correlations have been found the depth can be easily calculated from the distance between the correlating pixels. The distance between correlating pixels is called disparity and is measured in number of pixels. For example, if the correlating pixels are 5 pixels apart they have a disparity of 5. The depth is computed by the simple formula:

$$\text{Depth} = f*b/\text{disparity}$$

Here, f is the focal length of the camera and b is the baseline. The baseline is the 3D distance between the two cameras.

Finding single pixel correlations is hard. Hence, an area (patch) around each pixel is used for finding correlations. If this area has a rectangular shape this approach is called block-matching. A major problem in finding correlations with patches is that this constitutes an inherent assumption that the depth (or disparity) values of all pixels within that patch are the same because only pixels from the same depth are depicted in the same spatial arrangement in both stereo images. Since the scene observed by a (stereo) camera consists of many surfaces that are not fronto-parallel, the assumption is violated quite often. Fortunately, the approach works well as long as the differences between the different pixel's depth values are not too large.

However, for strongly slanted surfaces like a street surface this leads to gross errors as shown on FIG. 2. While fronto-parallel objects like houses or trees look the same in both stereo camera images, strongly slanted surfaces like the street change their spatial 2D layout between the two stereo camera images. Due to this, trying to correlate patches from the left image (e.g. a 3×3 patch around the pixel K) will fail as the spatial layout of the pixels has changed in the right image.

The invention counteracts this problem by applying a warping $\Omega$ to one of the stereo images prior to the actual patch-based correspondence search. For example the warping is applied to the right stereo image R to get a transformed image $R^T$.

$$R^T = \Omega(R)$$

This means that the position (x, y) of a pixel p is changed to $(x^T, y^T)$ via the position transformation $$x^T = w_x(x,y)$$

$$y^T = w_y(x,y)$$

In order to do this, a warping model $\Omega$ has to be used which describes the expected spatial differences in the 2D layout of the pixels caused by the different points of view of the stereo (or multi) camera. For example for a street a simple linear model can be used $$x^T = w_x(x,y) = x + ay + n$$

$$y^T = w_y(x,y) = y.$$

Here "a" describes the orientation of the street with respect to the camera and "n" describes the distance of the street (offset) in the focal point. In this example rectified stereo images are assumed, thus the warping model does not need to change the y position of a pixel.

This is depicted in FIG. 3. In the top row, the images of FIG. 2 are shown. By warping for example the right image of the top row according to the warping model, the changes of the spatial layout of the pixels can be reduced. Now the correlation can succeed again because patches in the left and right stereo image look more similar (see FIG. 3, bottom row of images).

Since one image was warped prior to the depth calculation, the resulting disparity values are influenced by this warping. The disparity is defined as:

$$d = x_R - x_L$$

Since the $x_R$ are changed to $x_R^T$ a this will lead to a wrong disparity $d_a$ $$d_a = x_R^T - x_L$$

Thus there is a need to correct for this influence. This is done by subtracting the additional shift $s_x(x,y)$ of a pixel's position due to the warping from the disparity value $d_a$ of the pixel to get the correct disparity d.

$$d = d_a - s_x(x,y)$$

$$s_x(x, y) = x_R^T - x_R = x_R^T - \omega_x^{-1}(x_R^T, y_R^T)$$

The choice of the warping model depends on observed scene characteristics. In case of the street an affine model can be applied. Affine models describe the perspective view changes of planar surfaces between the two cameras of a stereo camera system. Since streets are usually flat (at least locally) the affine model can be used to describe the changes of a street. Of course the model also needs a proper parameterization. In case of a stereo camera mounted to a passenger car the relation between the car and street is usually known and, thus, can be fixed. However, in other cases the relations might not be known or change over time. In this case it is necessary to estimate the model parameters. This could either be done using disparity images that are computed without warping or by estimating the parameters from the disparity images of preceding time steps.

Another issue that needs consideration is that the image warping might deteriorate the spatial relation of pixels that do not follow the warping model. One example can be seen in FIG. 3. The house and the tree in the background badly skewed in the warped right image because they do not follow the warping model of the road. This will lead to a worse correlation instead of a better correlation. There are different options to counteract this problem. One could apply the warping model only to a part of the image where the model is expected to fit, e.g. only the lower part where mostly ground is seen. Another option is to do multiple stereo calculations using different warping models and combining the different (corrected) disparity (depth) images into one image. For this combination the matching (correlation value) can be used. The combined disparity (depth) image is a pixel-wise maximum selection from the different disparity (depth) maps.

$$d_c(p) = d_{i_{max}}(p) \qquad i_{max} = \underset{i}{\mathrm{argmax}} c_i(p)$$

In this equation $d_c(p)$ is the combined disparity (depth) for pixel p and $d_i(p)$ is the disparity (depth) of pixel p using the warping model i. In this fashion $i_{max}$ is the index of the warping model where the pixel p has the best correlation value $c_i(p)$. It should be noted here that one instance of the multiple disparity (depth) images can be a stereo computation without any warping model or a null model.

Altogether the invention for depth estimation can be summarized with four major steps.

First, images (left and right) are acquired from the stereo cameras.

Second, one camera image (e.g. the right stereo image) is warped according to a warping model.

Third, a standard depth computing algorithm is used to compute a disparity image from the two stereo images (of which one is warped).

Fourth, the disparity image is corrected by subtracting the shifts that were introduced due to the warping of one of the stereo images.

FIG. 4 depicts these basic steps as a flow chart.

In summary for the depth estimation based application domains, this allows for more accurate depth maps compared to normal stereo processing without warping the stereo images. This is achieved by correcting for occurring image transformations that are caused e.g. by the different view point of the different cameras and which hampers the process for finding correlations. Thus, the accuracy of depth estimates as well as subsequent processing stages like object recognition is improved.

Possible applications of the described method are driver assistant systems like collision warning, lane departure warning or cruise control. For example the improvement of the depth perception of the ground allows for using the depth data to detect drivable areas which then can be used as lane information in case no or only partial lane markings are available.

Another application field is in robotics systems, where the improved depth estimation is used for object detection.

Another application is an autonomous lawn mower. Here the improved depth perception of the ground allows for an accurate obstacle detection which can then be avoided without using the bump sensor.

Further, the invention can also be applied in various other domains, like systems for ground, water and/or air bound vehicles, generally including systems designed to assist a human operator. The method and system disclosed herein in general may be used whenever a technical (e.g., an electronic) system is required to autonomously deal with features occurring in a movement path observed and/or properties of objects (e.g., size, distance, relative/absolute position also to other objects, spatial alignment, relative movement, speed and/or direction and other related object features or feature patterns) which are presented to the system.

In order to process the obtained information (observations), the invention may use and include analysis means employing the processing module 3 and/or apply neural networks, which can generally be used to infer functions from observations. Neural networks allow working with none or only little a priori knowledge on a problem to be solved and also show a failure tolerant behavior. Problems that may be addressed relate, e.g., to feature identification, control (vehicle control, process control), decision making, machine vision and/or pattern recognition (facial recognition, object recognition, gesture recognition, speech recognition, character and text recognition), etc. A neural network thereby consists of a set of neurons and a set of synapses. The synapses connect neurons and store information in parameters called weights, which are used in transformations performed by the neural network and learning processes.

Typically, to make an observation e.g. of a scene, the environment, . . . , an input signal or input pattern is accepted from the detection means 2 which is processed using hardware units and/or software components. An output signal or output pattern is obtained, which may serve as input to other systems for further processing, e.g. for visualization purposes.

The input signal, which may also include information on detected features influencing movement, may be supplied by one or more sensors, e.g. the mentioned visual detecting means 2, but also by a software or hardware interface. The output pattern may as well be output through a software and/or hardware interface or may be transferred to another processing module 3 or actor, e.g. a powered steering control or a brake controller, which may be used to influence the actions or behavior of the vehicle.

Computations and transformations required by the invention, necessary for evaluation, processing, maintenance, adjustment, and also execution (e.g. of movement change commands or actuation commands) may be performed by a processing module 3 such as one or more processors (CPUs), signal processing units or other calculation, processing or computational hardware and/or software, which might also be adapted for parallel processing. Processing and computations may be performed on standard off the shelf (OTS) hardware or specially designed hardware components. A CPU of a processor may perform the calculations and may include a main memory (RAM, ROM), a control unit, and an arithmetic logic unit (ALU). It may also address a specialized graphic processor, which may provide dedicated memory and processing capabilities for handling the computations needed.

Also data memory is usually provided. The data memory is used for storing information and/or data obtained, needed for processing, determination and results. The stored information may be used by other processing means, units or modules required by the invention. The memory also allows storing or memorizing observations related to events and knowledge deducted therefrom to influence actions and reactions for future events.

The memory may be provided by devices such as a hard disk (SSD, HDD), RAM and/or ROM, which may be supplemented by other (portable) memory media such as floppy disks, CD-ROMs, Tapes, USB drives, Smartcards, Pendrives etc. Hence, a program encoding a method according to the invention as well as data acquired, processed, learned or needed in/for the application of the inventive system and/or method may be stored in a respective memory medium.

In particular, the method described by the invention may be provided as a software program product on a (e.g., portable) physical memory medium which may be used to transfer the program product to a processing system or a computing device in order to instruct the system or device to perform a method according to this invention. Furthermore, the method may be directly implemented on a computing device or may be provided in combination with the computing device.

Generally, key aspects of the described method for depth calculation are: acquiring images from at least two cameras, warping the images of at least one of the cameras according to a warping model, calculating depth or disparity by comparing at least two images from at the least two cameras, where one of the images is the warped image and correcting the depth or disparity values according to the warping model. The at least two cameras can be a stereo camera. The calculation of depth or disparity can be achieved using a block-matching method. The block-matching method can use the sum of normalized cross-correlation as a correlation measure. The camera images can additionally be corrected for lens distortion. The camera images can be additionally rectified for parallel epipolar lines.

More than one warping model can be used to warp the one camera image. The method may be performed multiple times each with a different warping model and the corrected disparity (depth) images can be combined into one disparity (depth) image selecting the best depth value for each pixel. In addition to the computation of the depth or disparity image from the warped images, a computation of a depth or disparity image from the unwarped camera images can be performed and both results can be merged into a final result selecting the best value for each pixel. The best depth or disparity value is the one having a better correlation value.

The warp model can be estimated using a road detection preprocessing module. In the road detection preprocessing module the road can for example be detected by means of color or texture-based segmentation giving an assignment whether a pixel belongs to the road or not. Then the warping model can be estimated from the disparity values of the road pixels in a previous time step. The warping model for a current image frame may be estimated from a previous depth or disparity image or from a set of depth or disparity images from previous time steps. The warping model can also be given a-priori and fixed. The warping model can be an affine model. The depth or disparity results can be used to separate structures in the observed scene into accessible and non-accessible areas, e.g. separating pixels based on their height above the ground which can easily be derived from the depth map.

The depth or disparity results can be used to detect objects in a scene observed by the optical sensor, e.g. by segmenting homogenous regions in the depth or disparity map.

It should be understood that the foregoing relates not only to embodiments of the invention and that numerous changes and modifications made therein may be made without departing from the scope of the invention as set forth in the following claims.

Appendix

Stereo Camera:

A stereo camera is a type of camera with two lenses with a separate image sensor for each lens. Often, a stereo camera actually consists of two separate cameras attached to a rig. In this case the cameras might either be fixed or movable. In the fixed case the cameras are usually aligned with image sensors being coplanar (parallel setup). In the movable case such a stereo camera is usually used to mimic the vergence movement of human eyes.

The invention claimed is:

1. A method for processing images to generate a disparity/depth image reconstructing a 3D scene layout, the method comprising:
    obtaining, from an optical stereo sensor, at least two images captured at a same time,
    applying an image warping function to at least one of the two images to compensate a distortion in the image by modifying the image,
    determining, by a processing unit, patches corresponding to each other in the modified image and at least one other image of the at least two images, wherein a patch comprises an area comprising plural pixels with a same depth around a pixel,
    calculating a disparity of pixels corresponding to each other between one and the other of the determined patches,
    correcting, the calculated disparity by subtracting a shift of each pixel's position in a surface of the modified image, the shift introduced due to the image warping function application, and
    outputting a depth or disparity image from the modified image and the at least one other image of the at least two images based on the corrected disparity,
    wherein in addition to the computation of the depth or disparity image from the modified image, a further depth or disparity image from the unmodified at least one other image is calculated, and wherein the results are merged into one disparity/depth image by a pixel-wise selection from the depth or disparity image from the modified image and the further depth or disparity image.

2. The method according claim 1, wherein the disparity image is corrected by subtracting shifts of a pixel's position introduced due to the image warping function application or wherein the method comprises a step of detecting whether one of the at least two images includes a distortion.

3. The method according to claim 1, wherein the optical stereo sensor comprises a stereo camera or a multi-camera system or wherein the distortion comprises a perspective difference between the at least two images.

4. The method according to claim 1, wherein the depth or disparity image is calculated with a block-matching method.

5. The method according to claim 1, wherein a summed of normalized cross-correlation is used as a correlation measure.

6. The method according to claim 1, wherein the images are corrected for lens distortion of the optical sensor.

7. The method according to claim 1, wherein the images are rectified for parallel epipolar lines.

8. The method according to claim 1, wherein more than one image warping function is applied to at least one of the images.

9. The method according to claim 1, wherein the method steps are performed more than once each time with a different image warping function and corrected disparity/depth images resulting from each performance are combined into one disparity/depth image.

10. The method according to claim 1, wherein the image warping function for a current image is estimated from a previous depth or disparity image or from a set of previous depth or disparity images.

11. The method according to claim 1, wherein the image warping function is defined a-priori and fixed or is an affine model.

12. The method according to claim 1, wherein structures in a scene observed by the optical stereo sensor are separated into accessible or non-accessible areas based on the depth or disparity results resulting from the calculation of the depth or disparity image.

13. The method according to claim 1, wherein objects or moving objects in a scene observed by the optical sensor are detected based on the depth or disparity results resulting from the calculation of the depth or disparity image.

14. The method according to claim 1, wherein the optical stereo sensor is a multi-sensor system.

15. A sensor system for processing images to generate a disparity/depth image reconstructing a 3D scene layout, the sensor system comprising at least an optical stereo sensor, the sensor system further comprising a processor and at least one memory including computer program code, wherein the at least one memory and the computer program code are configured to, with the processor, to cause the sensor system at least to:
    obtain, from the optical stereo sensor, at least two images captured at a same time,
    apply an image warping function to at least one of the two images to compensate a distortion in the image by modifying the image,
    determine patches corresponding to each other in the modified image and at least one other image of the at least two images, and to calculate a disparity of pixels corresponding to each other in one and the other of the determined patches, wherein a patch comprises an area comprising plural pixels with a same depth around a pixel, correct the calculated disparity by a shift of each pixel's position in a surface of the modified image, the shift introduced due to the image warping function application, and output a depth or disparity image from the modified image and the at least one other image of the at least two images based on the corrected disparity, wherein in addition to the computation of the depth or disparity image from the modified image, a further depth or disparity image from the unmodified at least one other image is calculated, and wherein the results are merged into one disparity/depth image by a pixel-wise selection from the depth or disparity image from the modified image and the further depth or disparity image.

16. A land, air, sea or space vehicle equipped with a sensor system according to claim 15.

17. The vehicle according to claim 16, wherein the vehicle comprises a robot or a motorcycle, a scooter, other wheeled vehicle, a passenger car or a lawn mower.

18. A vehicle driver assistance system including the sensor system of claim 15.

19. A computer program product embodied on a non-transitory computer-readable medium, said computer program product comprising code that, when executed on a computer, controls the computer to perform the method according to claim 1.

\* \* \* \* \*